United States Patent [19]

Rombout et al.

[11] Patent Number: 4,863,500
[45] Date of Patent: Sep. 5, 1989

[54] APPARATUS FOR SOLIDS-FLUID SEPARATION

[75] Inventors: René Rombout; Jouke J. Woudstra, both of The Hague, Netherlands

[73] Assignee: Shell Oil Company, Houston, Tex.

[21] Appl. No.: 262,070

[22] Filed: Oct. 24, 1988

Related U.S. Application Data

[63] Continuation of Ser. No. 919,921, Oct. 16, 1986, abandoned.

[30] Foreign Application Priority Data

Nov. 5, 1985 [GB] United Kingdom ................. 8527215

[51] Int. Cl.$^4$ .............................................. B01D 45/12
[52] U.S. Cl. ...................................... 55/348; 55/349; 209/144
[58] Field of Search ................. 55/343, 345, 349, 348; 209/144

[56] References Cited

U.S. PATENT DOCUMENTS

| | | | |
|---|---|---|---|
| 373,374 | 11/1887 | Morse | 55/459 B |
| 1,953,948 | 4/1934 | Bieth | 183/80 |
| 2,223,652 | 12/1940 | White | 183/110 |
| 2,372,514 | 3/1945 | Pootjes | 209/144 |
| 2,399,509 | 4/1946 | Rich | 183/34 |
| 2,511,387 | 6/1950 | Watson et al. | 55/343 |
| 2,553,175 | 5/1951 | Davenport | 55/343 |
| 2,667,944 | 2/1954 | Crites | 55/346 |
| 2,718,491 | 9/1955 | Green | 208/155 |
| 2,888,096 | 5/1959 | Evans | 183/80 |
| 2,901,420 | 8/1959 | Evans | 208/153 |
| 2,985,516 | 5/1961 | Traue et al. | 422/147 |
| 3,137,133 | 6/1964 | Wilson et al. | 60/39.02 |
| 3,672,502 | 6/1972 | Janich | 209/144 |
| 3,710,558 | 1/1973 | Feder | 55/338 |
| 3,769,781 | 11/1973 | Klein et al. | 55/261 |

(List continued on next page.)

FOREIGN PATENT DOCUMENTS

| | | |
|---|---|---|
| 222436 | 5/1987 | European Pat. Off. . |
| 851483 | 8/1952 | Fed. Rep. of Germany . |
| 875933 | 5/1953 | Fed. Rep. of Germany . |
| 1607746 | 11/1971 | Fed. Rep. of Germany . |
| 3009214 | 3/1980 | Fed. Rep. of Germany . |
| 51526 | 11/1966 | German Democratic Rep. . |
| 541472 | 4/1956 | Italy . |
| 671857 | 5/1979 | U.S.S.R. . |
| 1060-231-A | 10/1982 | U.S.S.R. . |
| 1150041A | 7/1983 | U.S.S.R. . |
| 1150041 | 4/1985 | U.S.S.R. . |
| 568298 | 3/1945 | United Kingdom ................ 208/164 |

OTHER PUBLICATIONS

"Application of Mathematical Models and Computers for Optimizing and Controlling Suspension Separation Processes in Hydrocyclones," V. V. Naidenko, Gorhii, Volgo-Vtyatskoe Publishing House, p. 108.

"Hydrodynamics of Hydrocyclones," A. M. Kutepov, I. G. Ternovskii, and A. A. Kuznetsov, Journal of Applied Chemistry of the U.S.S.R., vol. 53, No. 12, Part 1, Dec. 1980.

Primary Examiner—Bernard Nozick

[57] ABSTRACT

An apparatus suitable for solids-fluid separation (e.g. cracking catalyst/flue gas) is disclosed in which a housing encloses a first stage separation means which includes a feed inlet means which cooperate substantially tangentially with a hollow body having solids outlet means in its lower section. A fluid outlet means communicates with the hollow body with a plurality of annular inlet means of a second stage separation means. The annular inlet means are provided with swirl imparting means and are defined between the upper sections of a plurality of tubular elements and tubular fluid outlet means arranged such that the lower sections of the tubular fluid outlet means are substantially coaxial within the upper sections of the tubular members and the upper sections of the tubular fluid outlet means communicate with opening(s) in the upper section of the housing. Solids outlet means communicate with the lower sections of the tubular elements. The invention further relates to a process for separating fluid cracking catalyst particles from flue gases and/or hydrocarbon conversion products using said apparatus.

9 Claims, 2 Drawing Sheets

U.S. PATENT DOCUMENTS

| | | | |
|---|---|---|---|
| 3,802,164 | 4/1974 | Bowen | 55/338 |
| 3,959,123 | 5/1976 | Wikdahl | 209/211 |
| 4,148,721 | 4/1979 | Brown et al. | 209/211 |
| 4,206,174 | 6/1980 | Heffley et al. | 422/144 |
| 4,313,910 | 2/1982 | Dries et al. | 422/147 |
| 4,378,234 | 3/1983 | Suzuki et al. | 55/338 |
| 4,397,738 | 8/1983 | Kemp | 208/161 |
| 4,404,095 | 9/1983 | Haddad et al. | 208/161 |
| 4,426,212 | 1/1984 | Zacher | 55/345 |
| 4,448,753 | 5/1984 | Gross et al. | 422/144 |
| 4,455,220 | 6/1984 | Parker et al. | 208/164 |
| 4,555,220 | 6/1984 | Parker et al. | 208/161 |
| 4,572,780 | 2/1986 | Owen et al. | 208/161 |
| 4,588,558 | 5/1986 | Kam et al. | 422/113 |
| 4,629,552 | 12/1986 | Haddad et al. | 208/161 |
| 4,666,674 | 5/1987 | Barnes | 422/144 |

APPARATUS FOR SOLIDS-FLUID SEPARATION

This is a continuation of application Ser. No. 919,921 filed Oct. 16, 1986, now abandoned.

BACKGROUND OF THE INVENTION

The invention relates to an apparatus and a process for solids-fluid separation and to products obtained by such a process.

It is known to separate solids from gases by imparting a rotating movement to a solids-gas mixture which is introduced substantially horizontally and tangentially in a vertical cylindrical body (e.g. a cyclone) from which gas is discharged at the top and solids are discharged from the bottom. The discharged gas usually still contains a substantial amount of solids which, to a large extent, can be removed by subsequently introducing the solids-containing gas tangentially into a second-stage cyclone.

However, in order to attain substantially complete removal of small solid particles (e.g. catalyst fines) from gases, as required in e.g. catalytic cracking processes, a third separation stage is usually required. It is known to use cylindrical cyclones with axial entry of a solids-gas mixture for such a purpose.

A disadvantage of three-stage solids-fluid separation is that in many cases the third stage separation means have to be located in a separate housing, particularly when carried out at an elevated temperature and pressure. This requires an additional pressure vessel and transfer lines. Alternatively, when three separation stages are incorporated in a single housing, complex supporting means will be required to cope with temperature expansion problems.

Moreover, the pressure drop over three separation stages will have an adverse effect on the possible recovery of power from fluid discharged at elevated pressure from a third separation stage.

SUMMARY OF THE INVENTION

It has now been found that the aforementioned disadvantages can be overcome by particularly arranged (first- and second stage) separation means in a housing, resulting in a simplified construction and maintenance and in a reduced pressure drop compared with three stage separation apparatuses.

The invention therefore relates to an apparatus suitable for solids-fluid separation which comprises a housing enclosing first stage separation means having feed inlet means which cooperate substantially tangentially with a hollow body having solids outlet means in its lower section and fluid outlet means communicating with a plurality of annular inlet means of second stage separation means. The annular inlet means are provided with swirl imparting means and are defined between the upper sections of a plurality of tubular elements and tubular fluid outlet means. The lower sections of the tubular fluid outlet means are arranged substantially coaxially within said upper sections and the upper sections cooperate with opening(s) in the upper section of the housing. The solids outlet means cooperate with the lower sections of the tubular elements.

In addition to the important advantages mentioned hereinbefore, the apparatus according to the invention even can cope with large variations in solids loads, which may occur e.g. during misoperation of first stage separation means such as cyclones, without becoming overloaded (thus leaving an undesirably large amount of solids in the discharged gas stream) or even becoming plugged by solids.

The apparatus according to the invention can be employed in processes wherein solids have to be separated from fluids (in particular gases at elevated temperatures and pressure) such as catalytic cracking, shale conversion processes and coal- or heavy oil gasification.

BRIEF DESCRIPTION OF THE DRAWINGS

Preferred embodiments of the apparatus according to the invention are described hereinafter, with reference to the drawings in which.

DESCRIPTION OF THE PREFERRED EMBODIMENT

Figure 1:
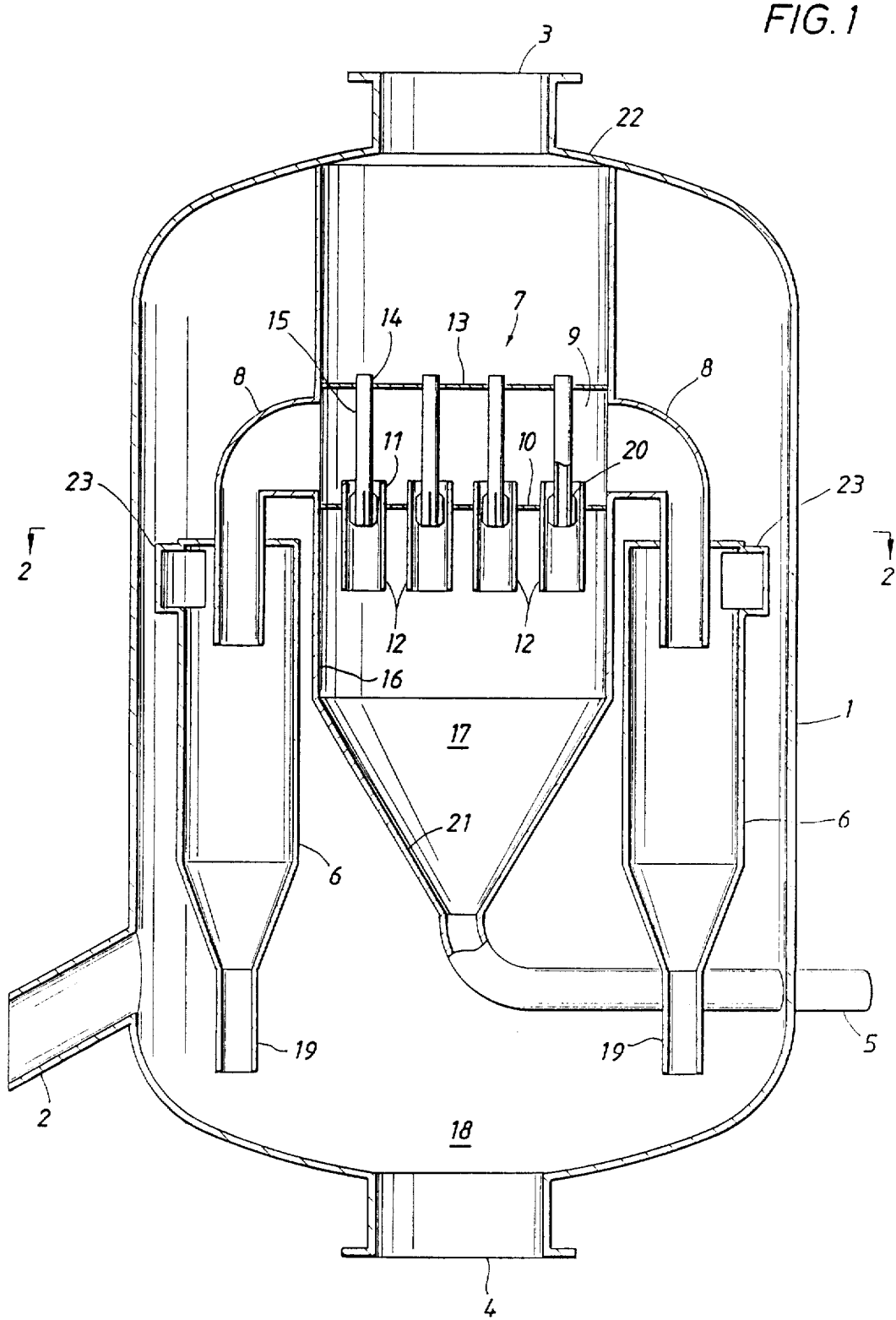
FIG. 1 is a longitudinal cross sectional view of a fully enclosed individual separation apparatus constructed in accordance with the present invention.
Figure 2:
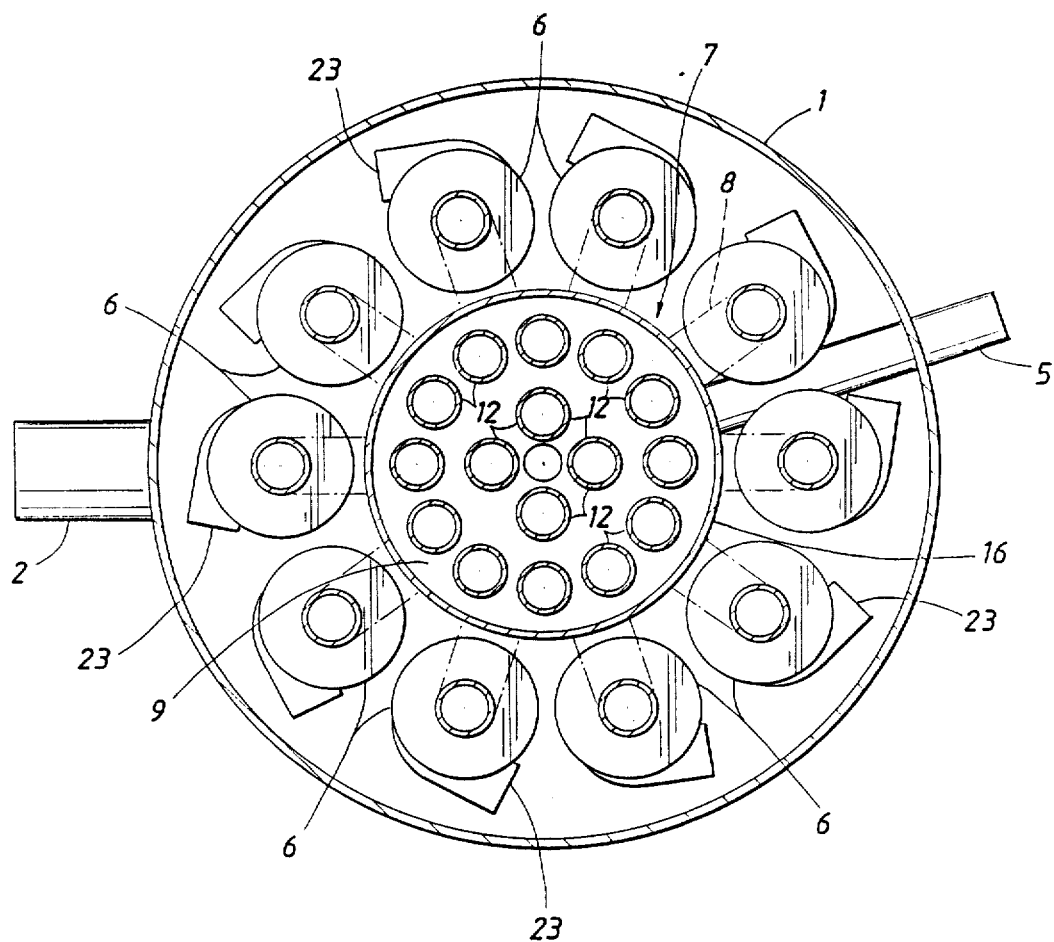
FIG. 2 is a cross sectional view of the apparatus depicted in FIG. 1 taken at line 2—2 of FIG. 1.

The apparatus depicted in the FIGS. 1 and 2 comprises a housing 1 provided with an inlet means 2 for a mixture of solids and fluid, an outlet means 3 for substantially solids-free fluid, an outlet means 4 for relatively large particulate solids and an outlet means 5 for relatively small particles (e.g. catalyst fines), optionally together with a relatively small flow of carrier fluid. In this preferred embodiment, a plurality (e.g. from 2-20) first stage separation means (such as cyclones 6 having substantially vertically arranged cylindrical bodies) are laterally spaced around a second stage separation means 7 in order to attain a good distribution of the solids-containing fluid which is discharged through a plurality of first stage fluid outlet means 8 into the second stage separator.

Moreover, the arrangement of first stage cyclones 6 as depicted saves space, compared with a set-up in which cyclones are placed underneath the second stage separation means. Optimal distribution of solids-containing fluid can be attained by mounting the first stage fluid outlet means 8 substantially radially and direccting them inward, which results in a substantially constant velocity of solids-containig fluid in a second stage inlet chamber 9 and thereby leads to a low pressure drop in the apparatus. Feed inlet means 23 are arranged tangentially and horizontally at the upper sections of bodies 6.

Chamber 9 has a lower wall 10 wherein upper sections 11 of tubular elements 12 are arranged and an upper wall 13 wherein upper sections 14 of tubular fluid outlet means 15 are arranged. Suitably, both the lower wall and the upper wall may be curved to increase their strength. Preferably, the vertical distance between the lower wall and the upper wall is substantially equal at any given point in order to keep the length of all fluid outlet tubes 15 substantially equal, thus avoiding pressure differences between the various separation elements of the second stage which might otherwise cause fluid and/or solids surging effects ("cross-talk") between different elements.

The tubular elements 12 are preferably arranged substantially vertically in a secondary housing 16, thus providing a separate solids collection space 17 communicating with outlet 5 for fine particles, and space 18 communicating with solids outlets 19 for larger particles separated in the first stage.

During operation, the mixture of solids and fluid is subjected to a helical movement in the lower sections of tubular elements 12 and/or of the cylindrical bodies 6, in which vortex stabilizer means (not shown) may be arranged. Swirl imparting means 20 (suitably outwardly curved swirl vanes) are located in the upper sections 11 of said tubular elements, and are preferably attached to tubular fluid outlet means 15 which are arranged substantially coaxially within said upper sections. Alternatively, inwardly extending swirl imparting means can be attached to the upper sections 11 and of the tubular elements 12.

The length:diameter ratio of the tubular elements 12 is suitably from 1–10, and preferably from 2–5. The ratio of the diameters of the tubular elements 12 and the tubular fluid outlet means (15) is suitably from 1.2–4, and preferably from 1.5–2.5. The diameter of the tubular elements 12 is suitably from 0.05–1 m, and preferably from 0.1–0.8 m; the diameter of the first stage cyclones is usually larger, due to the higher solids-loading of the fluid entering the first stage, suitably from 0.5–8 m and preferably from 1–6 m.

In some cases it can be advantageous to incorporate further (third stage) separation means, such as a cyclone or a single tubular element (not shown in the Figures), in the (suitably conical) bottom section 21 of secondary housing 16.

When hot gases (e.g. having a temperature from 400°–750° C., or even up to 850° C.) are discharged through tubes 15 at an elevated pressure (e.g. from 2–50 bar abs), e.g. during operation of the apparatus according to the invention as (part of) a fluid cracking catalyst regenerator, it can be advantageous to recover power by expanding said hot gases in a turbo expander. The turbo expander then drives a compressor for e.g. oxygen-containing gas (such as air) which can be subsequently introduced at the required pressure through an additional fluid inlet (not shown in FIG. 1) in the bottom section of housing 1.

In such a case it may be necessary to cool the hot gases to a temperature level at which the turbo expander can safely operate; injection means (not shown) are suitably arranged for such cooling fluid (e.g. steam) in the upper section 22 of the second stage separator 7.

The invention further relates to a process for separating solid particles from fluid, in particular for separating fluid catalyst cracking particles from flue gas. This process comprises passing a mixture of solid particles and fluid tangentially into a first separation zone, such as cyclone 6, wherein the mixture is subjected to a rotating movement, removing solid particles through an opening in the lower section of said first zone and passing solids-containing fluid through the upper section of the first zone substantially downwardly into annular spaces of a second separation zone such as chamber 9. Annular spaces of the second separation zone are provided with swirl imparting means and are defined between the upper sections of tubular elements 12 and the lower sections of tubular fluid outlet means 15 arranged substantially coaxially within said upper sections, imparting a helical movement to the solids-containing fluid in the tubular elements to separate remaining solids from fluid, removing solids through the lower sections of tubular elements 12 and removing fluid upwardly through the upper sections of tubular fluid outlet means 15.

Apart from flue gas, other gases such as gaseous hydroconversion products or gases obtained in shale conversion processes and coal- or heavy oil gasification process can also be separated from solid particles in the above described manner.

Suitably, catalyst particles (and sometimes fines) which have been re-activated by burning off coke deposits therefrom and separated from the resulting flue gas in the apparatus according to the invention are re-used in e.g. a fluid catalytic cracking riser reactor.

Moreover, the invention relates to solids separated by a process as described hereinbefore.

The invention will be further elucidated by means of the following Example.

EXAMPLE

A feed stream of cracking catalyst particles and flue gas in a weight ratio of 4.5 enters feed inlet 23 of a separation apparatus as depicted in FIGS. 1 and 2 at a temperature of 700° C., a pressure of 1.9 bar gauge and a vapor velocity of 20 m/s. Catalyst particles are removed through solids outlets 19 and 12 with a separation efficiency for the two stages combined of more than 99.9% on a weight basis.

What is claimed is:

1. An apparatus for solids-fluid separation comprising:
   a vertical substantially cylindrical housing;
   inlet means to the housing in the lower portion thereof;
   a first stage separation means having a plurality of vertically disposed cyclone separators disposed about the perimeter of the housing, each cyclone separator comprising:
      a feed inlet means above the inlet means and communicating openly with the housing and thereby the inlet means;
      a hollow body receiving the feed inlet means substantially tangentially at its upper end;
      a first stage fluid outlet means substantially at the upper end of the hollow body; and
      a first stage solids outlet means at the lower end of the hollow body terminating below the inlet means; and
   a second stage separation means comprising:
      a secondary housing within the housing connected with the first stage fluid outlet means;
      a plurality of tubular elements within the secondary housing;
      tubular fluid outlet means, the lower sections of which are arranged substantially coaxially within the upper section of the tubular elements;
      a swirl imparting means positioned at the communication of the tubular elements and the tubular fluid outlet means;
      a second stage solids outlet means in communication with the lower section of the tubular elements extending through the housing; and
      a substantially solids-free outlet means through the secondary housing and the housing, in communication with the upper sections of the tubular fluid outlet means.

2. An apparatus according to claim 1 wherein the first and second stage solids outlet means are in communication with separate sections of the housing.

3. An apparatus according to claim 1 wherein the tubular elements are arranged substantially vertically in the secondary housing.

4. An apparatus according to claim 1 wherein the diameter of the tubular elements is from 0.05–1 m.

5. An apparatus according to claim 1 wherein the length:diameter ratio of the tubular elements is in the range of 1-10.

6. An apparatus according to claim 5 wherein the length:diameter ratio of the tubular elements is in the range of 2-5.

7. An apparatus according to claim 1 wherein the ratio of the diameters of the tubular elements and the tubular fluid outlet means is in the range of 1.2-4.

8. An apparatus according to claim 7 wherein the ratio of the diameters of the tubular elements and the tubular fluid outlet means is in the range from 1.5-2.5.

9. An apparatus according to claim 8 wherein the diameter of the tubular elements is from 0.1-0.8 m.

* * * * *